US011237736B1

(12) United States Patent
Cai et al.

(10) Patent No.: US 11,237,736 B1
(45) Date of Patent: Feb. 1, 2022

(54) EFFICIENT DATA RECOVERY FOR TAPE STORAGE SYSTEM

(71) Applicant: Meta Platforms, Inc., Menlo Park, CA (US)

(72) Inventors: Yu Cai, Palo Alto, CA (US); John Mah, Westminster, CO (US); Chengyan Fu, Seattle, WA (US); Haoci Zhang, Seattle, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 125 days.

(21) Appl. No.: 16/601,295

(22) Filed: Oct. 14, 2019

(51) Int. Cl.
*G06F 11/10* (2006.01)
*G06F 3/06* (2006.01)
*G06F 11/08* (2006.01)

(52) U.S. Cl.
CPC ......... *G06F 3/0619* (2013.01); *G06F 3/0659* (2013.01); *G06F 3/0682* (2013.01); *G06F 11/08* (2013.01); *G06F 11/1076* (2013.01); *G06F 11/1084* (2013.01)

(58) Field of Classification Search
CPC ............ G06F 11/08; G06F 11/1076; G06F 11/1084; G06F 3/0682
See application file for complete search history.

(56) References Cited

U.S. PATENT DOCUMENTS

| 5,369,652 A * | 11/1994 | Bailey ................. G06F 11/1008 360/47 |
| 8,479,079 B2 * | 7/2013 | Cideciyan .............. G11B 20/18 714/771 |
| 2007/0217763 A1 * | 9/2007 | Siemens .......... G08B 13/19667 386/226 |
| 2008/0276152 A1 * | 11/2008 | Hughes ............... G06F 11/1076 714/770 |
| 2010/0232047 A1 * | 9/2010 | Cherubini .......... G11B 20/1833 360/48 |
| 2016/0350186 A1 * | 12/2016 | Blaum ................ H03M 13/373 |
| 2019/0361606 A1 * | 11/2019 | Goker ............... H03M 13/2918 |

* cited by examiner

*Primary Examiner* — Joseph O Schell
(74) *Attorney, Agent, or Firm* — Van Pelt, Yi & James LLP (57) ABSTRACT

An indication that a selected data set stored on a selected tape storage media is associated with a failure is received. An error correction data set group for the selected data set is identified, and wherein the error correction data set group includes a plurality of data sets and each data set included in the error correction data set group is stored on a different tape storage media. One or more data sets other than the selected data set that are included in the error correction data set group are selectively obtained from one or more corresponding tape storage media other than the selected tap storage media without reading entire contents of the one or more corresponding tape storage media. The obtained one or more data sets are utilized to recover at least a portion of the selected data set associated with the failure.

16 Claims, 11 Drawing Sheets

EFFICIENT DATA RECOVERY FOR TAPE STORAGE SYSTEM

BACKGROUND OF THE INVENTION

Because tape libraries are often utilized as the last tier of data backup, it is important that data is reliably stored in tape storage media. Error correction codes can be used to correct data errors in tape storage media. However, if the tape storage media's raw bit error rate is too high or its signal to noise ratio is too low, errors may not be correctable using existing error correction codes. In addition, the time taken to rebuild the data is often too long.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Typically, data that is not being accessed very often may be stored in a cold storage that includes multiple tape libraries. To avoid data loss, an error recovery scheme across different tape libraries may be used to rebuild data with errors. For example, the error recovery scheme may be a Reed-Solomon RAID (redundant array of independent disks) code such as a (5:7) RS-RAID code.

Figure 1:
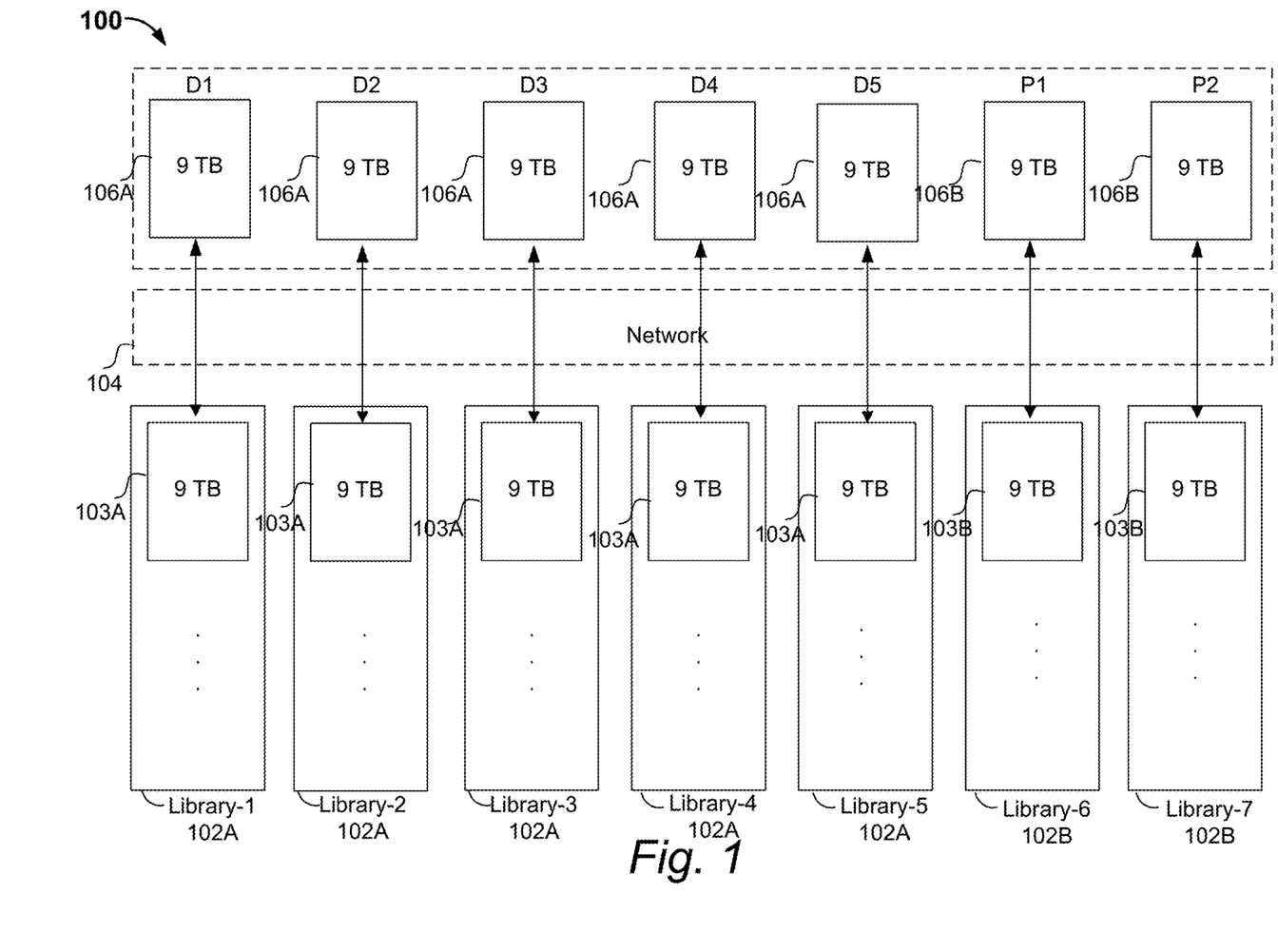
FIG. 1 illustrates an example of a tape storage system 100 that uses an error recovery scheme across a plurality of tape libraries to rebuild any failed data.

FIG. 1 illustrates an example of a tape storage system 100 that uses an error recovery scheme across a plurality of tape libraries to rebuild any failed data. Each tape library for storing user data (e.g., Library-1 102A, Library-2 102A, . . . and Library-5 102A) includes a plurality of (e.g., thousands of) cartridges 103A of tape media. Each tape library for storing parity data (e.g., Library-6 102B and Library-7 102B) includes a plurality of (e.g., thousands of) cartridges 103B of tape media. In some embodiments, each cartridge (103A or 103B) in a tape library (102A or 102B) may store multiple terabytes (e.g., nine terabytes, 9 TB) of data. In some embodiments, when a predetermined amount of data becomes available, the predetermined amount of data is divided into a plurality of chunks of user data 106A, such that each of the chunks of user data 106A may be stored in a cartridge 103A in a different tape library 102A. For example, when 45 terabytes of data is ready, the data is divided into five chunks of 9 terabytes data blocks 106A to form a single group. The five chunks of data blocks 106A in the group are shown in FIG. 1 as D1, D2, D3, D4, and D5, which are stored in Library-1, Library-2, Library-3, Library-4, and Library-5, respectively. Tape storage system 100 calculates two versions of parity data blocks 106B that provide error-correction for the group of data blocks D1, D2, D3, D4, and D5. For example, the two versions of parity data blocks 106B are P1 and P2, which are each 9 terabytes in size. The P1 and P2 parity data blocks 106B are stored in two different cartridges 103B that are located in two different tape libraries 102B, Library-6 and Library-7, respectively.

When there is a failure in reading only one or two 9 TB data blocks in a group, the other 9 TB data blocks in the group may be read from the tape libraries to rebuild the failed data blocks using Reed-Solomon decoding, such as RS(5:7) decoding. For example, if any data inside one 9 TB data block (e.g., D2) has error(s), the storage software running in tape storage system 100 may read the other six 9 TB data blocks (D1, D3-D5, P1, and P2) in the same error correction group and leverage the RS(5:7) code to rebuild the failed 9 TB data in D2.

This traditional technique has a number of drawbacks. First, the data rebuild time is excessively long. Even if there is an error in reading only a small amount of data in D2, the remaining six whole 9 TB data blocks (a total of 54 TB of data) in the same group must be read. Since reading one 9 TB data block from a tape cartridge (103A or 103B) may take hours, reading the remaining six whole 9 TB data blocks would take an excessively long period of time. In addition, the six 9 TB data is transferred through a network 104, which will cause significant amount of network congestion.

Second, RS(5:7) decoding can only tolerate up to two cartridge failures. If three or more cartridges in the group have errors, then the error correction provided by an RS(5:7) code will not be able to recover the data. Therefore, a new error recovery scheme that is more efficient and can correct more cartridge failures would be desirable.

Figure 2:
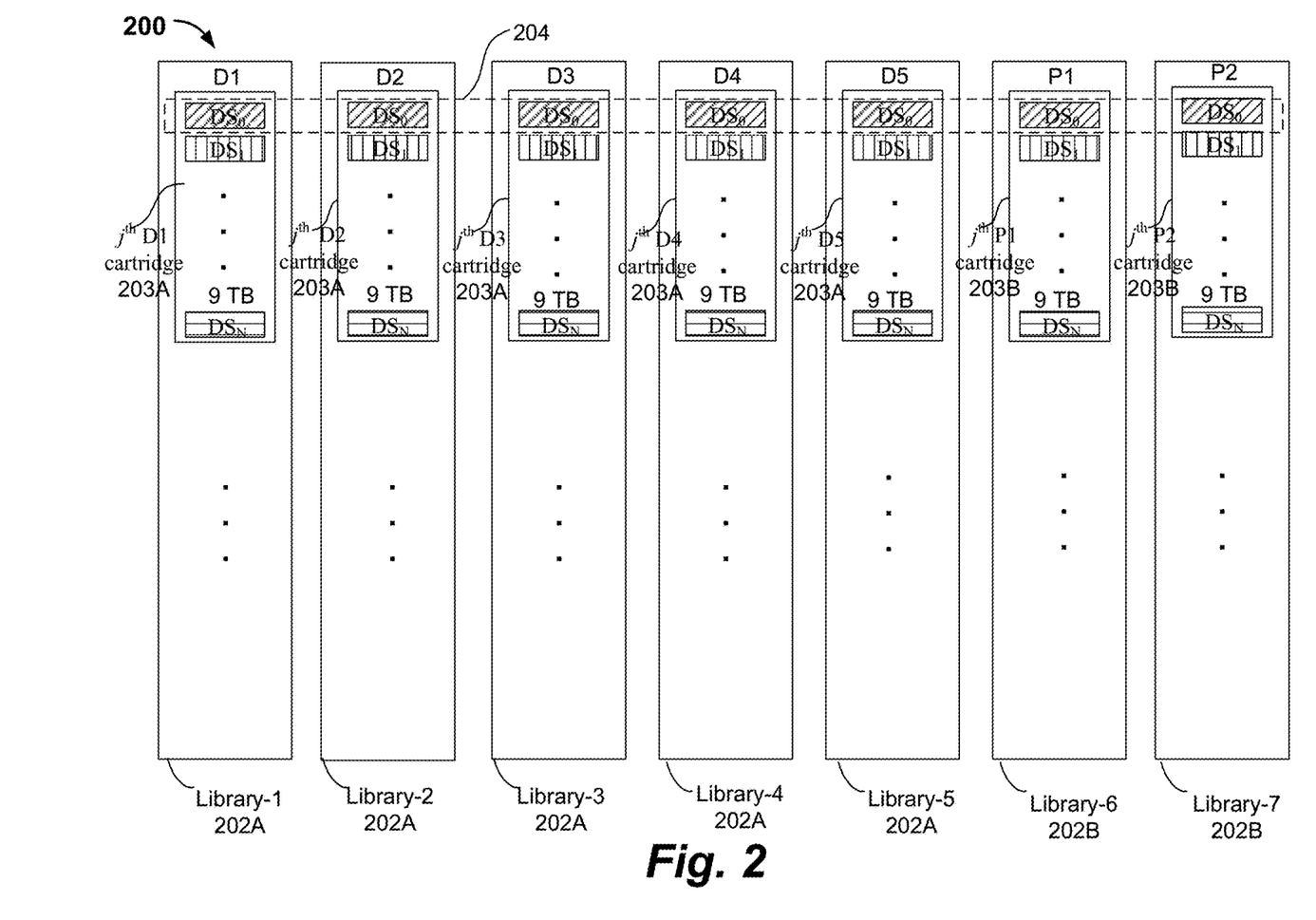
FIG. 2 illustrates an embodiment of a tape storage system 200 that uses an improved error recovery technique across a plurality of tape libraries to rebuild any failed data.

FIG. 2 illustrates an embodiment of a tape storage system 200 that uses an improved error recovery technique across a plurality of tape libraries to rebuild any failed data. Tape storage system 200 includes a plurality of tape libraries. In some embodiments, the number of tape libraries in the tape storage system is seven. Five of the tape libraries (Library-1 202A, Library-2 202A, Library-3 202A, Library-4 202A, and Library-5 202A) store user data (D1-D5) and two of the tape libraries (Library-6 202B and Library-7 202B) store two different versions of parity data (P1 and P2), respectively. In some other embodiments, the number of tape libraries for storing user data and the number of tape libraries for storing the different versions of parity data may be different.

Each tape library for storing user data (e.g., Library-1 202A, Library-2 202A, . . . and Library-5 202A) includes a plurality of (e.g., thousands of) cartridges 203A of tape media. Each tape library for storing parity data (e.g., Library-6 202B and Library-7 202B) includes a plurality of (e.g., thousands of) cartridges 203B of tape media. For example, each tape library includes M+1 number of cartridges (203A or 203B). In some embodiments, each $j^{th}$ cartridge (203A or 203B) in a tape library (202A or 202B) may store multiple terabytes (e.g., nine terabytes, 9 TB) of data, where j=0, 1, 2, . . . M.

The 9 TB data in the cartridge (203A or 203B) may be divided into a plurality of data sets (DSs). In some embodiments, a data set includes x megabytes (e.g., 5 MB) of data. In each cartridge (203A or 203B), each of the data sets is numbered from zero to a certain number (e.g., N=1 million). For example, as shown in FIG. 2, in each cartridge (203A or 203B), the data sets are $DS_i$, including $DS_0$, $DS_1$, $DS_2$, . . . and $DS_N$, where i=0, 1, 2, . . . N.

Instead of having all the data in each entire cartridge belonging to the same error correction group, only a data set in one cartridge in each tape library is combined with another data set in one cartridge in the other tape libraries to form the same error correction data set group. The $i^{th}$ data set ($DS_i$) in the $j^{th}$ cartridge in each of the tape libraries (202A or 202B) all together form an error correction data set group 204 for error correction. For example, as shown in FIG. 2, $DS_0$ in Library-1 202A, $DS_0$ in Library-2 202A, $DS_0$ in Library-3 202A, $DS_0$ in Library-4 202A, $DS_0$ in Library-5 202A, $DS_0$ in Library-6 202B, and $DS_0$ in Library-7 202B form a group for error correction, as indicated by the same shade pattern. $DS_1$ in Library-1 202A, $DS_1$ in Library-2 202A, $DS_1$ in Library-3 202A, $DS_1$ in Library-4 202A, $DS_1$ in Library-5 202A, $DS_1$ in Library-6 202B, and $DS_1$ in Library-7 202B form a second group for error correction, as indicated by a different shade pattern.

The $i^{th}$ data set ($DS_i$) in the $j^{th}$ cartridge in Library-6 202B (P1) and the $i^{th}$ data set ($DS_i$) in the $j^{th}$ cartridge in Library-7 202B (P2) are the parity data of the five $i^{th}$ data sets ($DS_i$) in the $j^{th}$ cartridge in Library-1 202A, Library-2 202A, Library-3 202A, Library-4 202A, and Library-5 202A (D1-D5). For example, as shown in FIG. 2, $DS_0$ in Library-6 202B is the first version of error-correcting information (P1) for the five $DS_0$ data sets in Library-1 to Library-5 (D1-D5). $DS_0$ in Library-7 202B is the second version of error-correcting information (P2) for the five $DS_0$ data sets in Library-1 to Library-5 (D1-D5). Similarly, as shown in FIG. 2, $DS_1$ in Library-6 202B is the first version of error-correcting information (P1) for the five $DS_1$ data sets in Library-1 to Library-5 (D1-D5). $DS_1$ in Library-7 202B is the second version of error-correcting information (P2) for the five $DS_1$ data sets in Library-1 to Library-5 (D1-D5).

The one or more versions of data set group level error-correcting information for each data set group are calculated by one or more head node machines. These parity bytes (P1 or P2) include data set group level error-correcting information that corrects the errors within the data sets in a data set group. In the example shown in FIG. 2, the one or more versions of data set group level error-correcting code include P1 and P2. However, different numbers of versions (e.g., 3 or 4) of the data set group level error-correcting code may be used. In some embodiments, each of P1 and P2 is a function of the data sets in a group, such as a linear weighted function over a Galois field.

Figure 3:
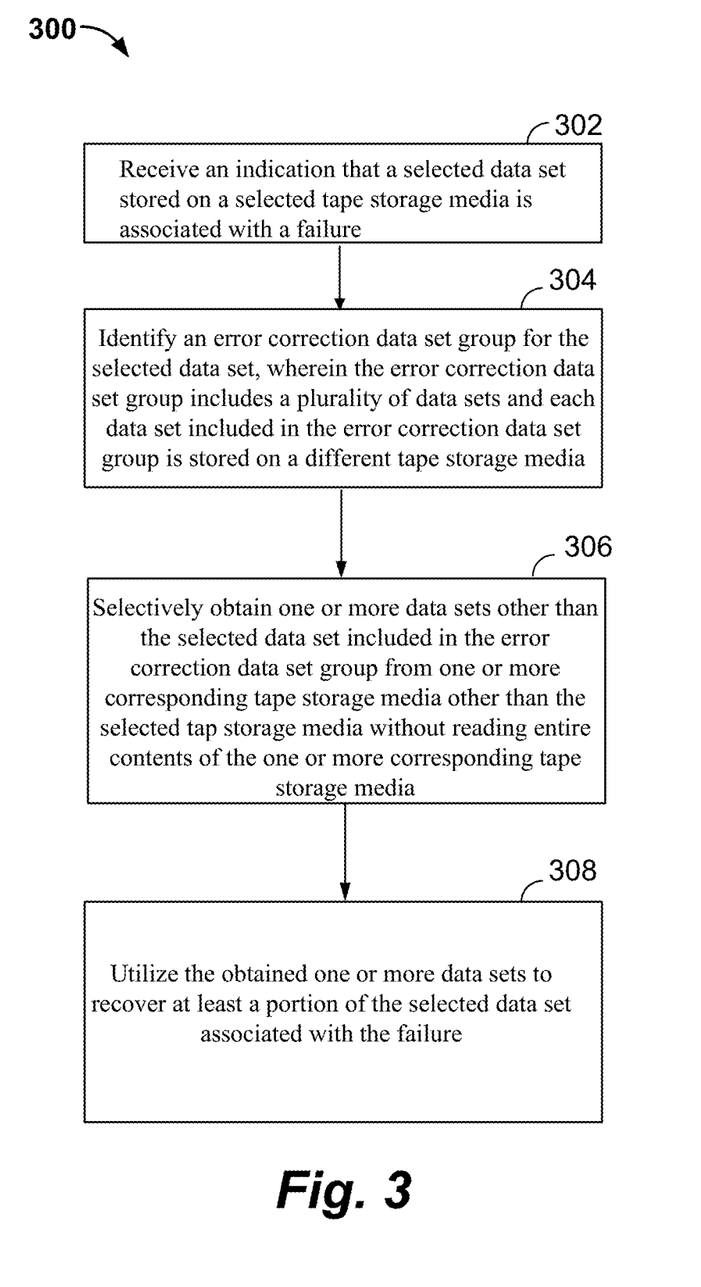
FIG. 3 illustrates an embodiment of a flow diagram of a process 300 that uses an improved error recovery technique across a plurality of tape libraries to rebuild any failed data.
Figure 4:
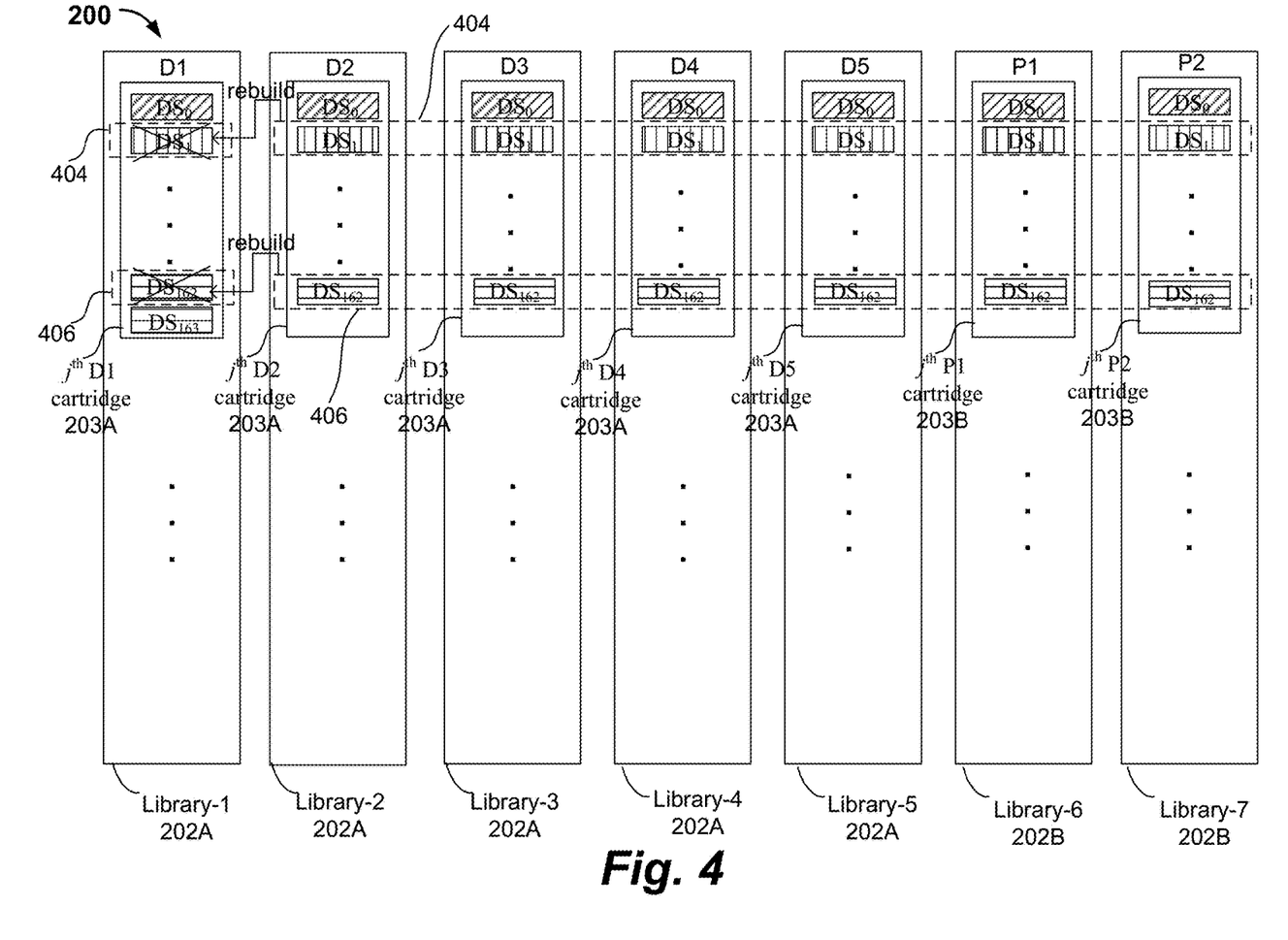
FIG. 4 illustrates an example in which process 300 is performed to recover any failed data read from tape storage system 200.

FIG. 3 illustrates an embodiment of a flow diagram of a process 300 that uses an improved error recovery technique across a plurality of tape libraries to rebuild any failed data. In some embodiments, process 300 is performed in the tape storage system 200 shown in FIG. 2. FIG. 4 illustrates an example in which process 300 is performed to recover any failed data read from tape storage system 200.

The head node machine reads all the data sets in the D1 cartridge, even when it encounters some data sets that have errors. For example, as shown in FIG. 4, two data sets $DS_1$ and $DS_{162}$ in the D1 cartridge have errors (as indicated by a "x") when the data sets are read out by the head node machine. The head node machine continues to read $DS_2$ to $DS_{162}$ even when $DS_1$ has errors. Similarly, the head node machine continues to read $DS_{163}$ even when $DS_{162}$ has errors. After the head node machine finishes reading all the data sets in the D1 cartridge (e.g., all 9 TB of data), some data sets are correct, some data sets have failures, and some data sets may even be missing. In some embodiments, the head node machine then sends all the data sets (with or without failures) to one or more remote worker machines for cold storage.

With reference to FIG. 3, at step 302, an indication that a selected data set stored on a selected tape storage media is associated with a failure is received. In some embodiments, the failed data sets (i.e., $DS_1$ and $DS_{162}$) in the D1 tape storage media cartridge may be marked by the head node machine as data sets that have failures.

The remote worker machine in cold storage may process and rebuild the failed data sets one by one. With reference to FIG. 3, at step 304, an error correction data set group for the selected data set is identified. As shown in FIG. 4, the error correction data set group 404 is identified as the error correction data set group that corresponds to $DS_1$ in the D1 tape storage media cartridge. The error correction data set group 404 includes a plurality of data sets and each data set included in the error correction data set group is stored on a different tape storage media cartridge. Only one data set in one cartridge in each tape library is combined with another data set in one cartridge in the other tape libraries to form the same error correction data set group 404. The $i^{th}$ data set ($DS_i$) in the $j^{th}$ cartridge in each of the tape libraries (202A or 202B) all together form an error correction data set group for error correction. Error correction data set group 404 includes $DS_1$ in Library-1 202A, $DS_1$ in Library-2 202A, $DS_1$ in Library-3 202A, $DS_1$ in Library-4 202A, $DS_1$ in Library-5 202A, $DS_1$ in Library-6 202B, and $DS_1$ in Library-7 202B, as indicated by the same shade pattern.

Similarly, the error correction data set group 406 is identified as the error correction data set group that corresponds to $DS_{162}$ in the D1 tape storage media cartridge. Error correction data set group 406 includes $DS_{162}$ in Library-1 202A, $DS_{162}$ in Library-2 202A, $DS_{162}$ in Library-3 202A, $DS_{162}$ in Library-4 202A, $DS_{162}$ in Library-5 202A, $DS_{162}$ in Library-6 202B, and $DS_{162}$ in Library-7 202B, as indicated by the same shade pattern.

At step 306, one or more data sets other than the selected data set included in the error correction data set group are selectively obtained from one or more corresponding tape storage media other than the selected tap storage media without reading the entire contents of the one or more corresponding tape storage media. Only the necessary data is fetched from the tape libraries for error recovery. For the $i^{th}$ data set failure processing, the cold storage may send a command (D2, $DS_i$) to the head node machine that only reads the $i^{th}$ data set in cartridge D2. In response, the head node machine may read the 5 MB $DS_i$ data set and then send this to cold storage. For example, for the failure processing of data set $DS_1$ (i=1) in the D1 cartridge, the cold storage may send a command (D2, $DS_1$) that only reads data set $DS_1$ in cartridge D2. The same will be repeated for D3-D5 and P1-P2. For example, for D3, the cold storage may send a command (D3, $DS_1$) that only reads data set $DS_1$ in cartridge D3. For example, for P1, the cold storage may send a command (P1, $DS_1$) that only reads data set $DS_1$ in cartridge P1.

At step 308, the obtained one or more data sets are utilized to recover at least a portion of the selected data set associated with the failure. After reading all the remaining data sets in the same error correction data set group (i.e., the six data sets $DS_1$ in D2, D3, D4, D5, P1, and P2, respectively), a correct $DS_1$ in D1 may be rebuilt by the remote worker machine to replace the corrupted $DS_1$ in D1 using Reed-Solomon decoding, such as RS(5:7) decoding. Similarly, after reading all the remaining data sets in the same error correction data set group (i.e., the six data sets $DS_{162}$ in D2, D3, D4, D5, P1, and P2, respectively), a correct $DS_{162}$ in D1 may be rebuilt by the remote worker machine to replace the corrupted $DS_{162}$ in D1.

Using this technique, the system only needs to read a small amount of data for the purpose of recovering the failed data. For example, if each data set is 5 MB in size, the system only needs to read 30 MB (6*5 MB) of data to rebuild one failed data set, and only needs to read 3 GB (100*6*5 MB) to rebuild a hundred failed data sets.

In contrast, in the more traditional technique discussed above, if there is an unrecoverable error in reading cartridge D1 (e.g., $DS_1$), the head node machine will stop reading and discard all the data that has been read out of the cartridge. It will report the failure to the remote worker machines. The worker machine will be triggered to read the D2-D5 and P1-P2 cartridges that belong to the same error correction data set group as D1 to recover the data. A total of 6*9 TB=54 TB data will be read into cold storage to rebuild the 9 TB of data in the D1 cartridge.

Therefore, the technique as shown in process 300 is much more efficient, as the system only needs to read 30 MB (6*5 MB) of data to rebuild one failed data set, while the more traditional technique needs to read 54 TB of other data to rebuild one failed data set.

In some embodiments, batch processing may be used. For example, a plurality of data sets $DS_1$, $DS_{55}$, $DS_{100}$, and $DS_{160}$ in the D1 cartridge have errors when the data sets are read out by the head node machine. The head node machine continues to read the entire cartridge D1. After the head node machine finishes reading all the data sets in the D1 cartridge (e.g., all 9 TB of data), only the necessary data is fetched from the tape libraries for error recovery. The head node machine may specify that only $DS_1$, $DS_{55}$, $DS_{100}$, and $DS_{160}$ from D2-D5 and P1-P2 are read. The read data sets from D2-D5 and P1-P2 are then sent back and the failed data in D1 may be rebuilt. A complete cartridge of data in D1 is formed by combining the correctly read data sets in D1 with the rebuild data sets in D1.

Figure 5:
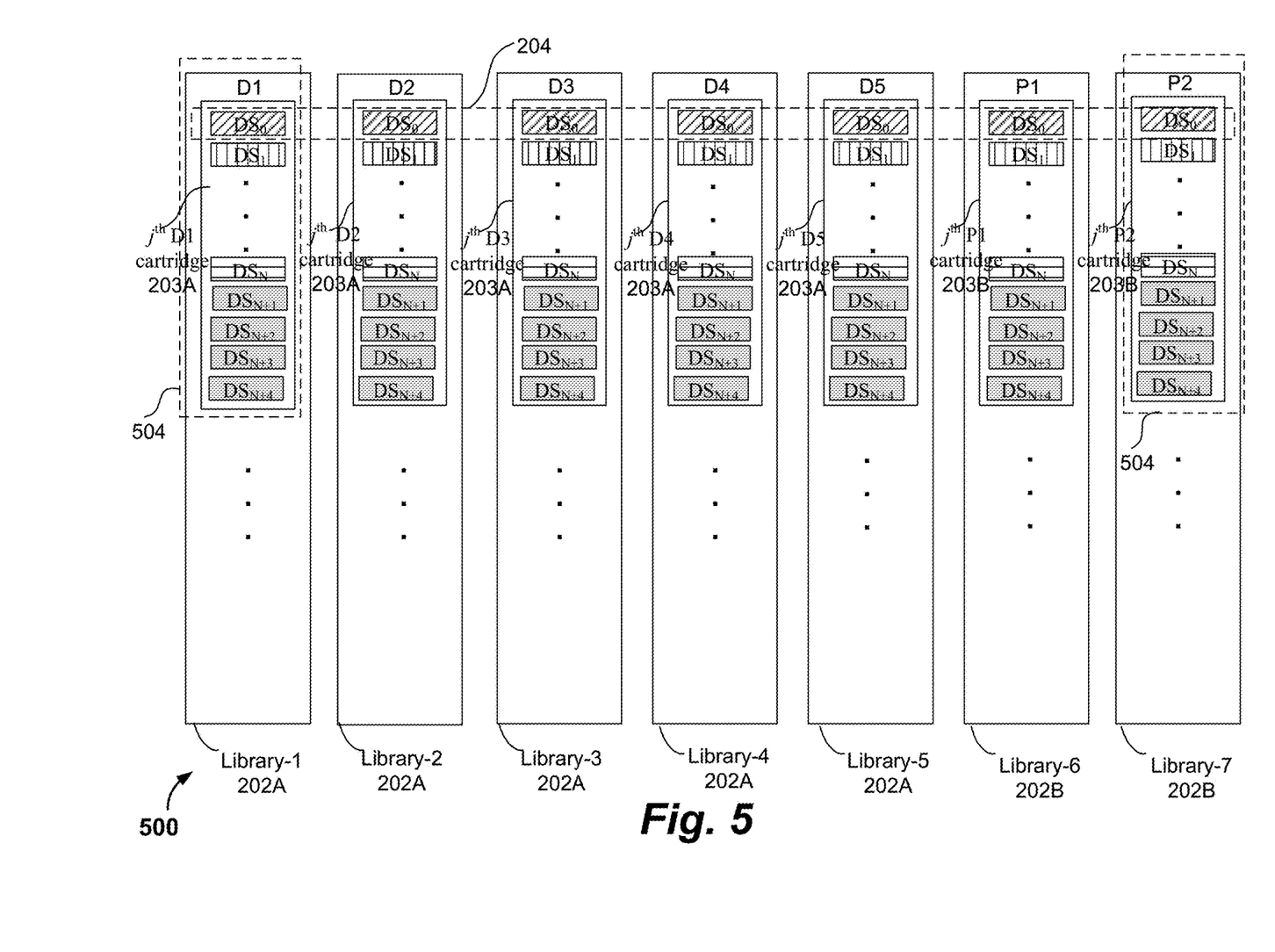
FIG. 5 illustrates another embodiment of a tape storage system 500 that uses an improved error recovery technique across a plurality of tape libraries to rebuild any failed data.

FIG. 5 illustrates another embodiment of a tape storage system 500 that uses an improved error recovery technique across a plurality of tape libraries to rebuild any failed data. Tape storage system 500 comprises a number of components which are common with the system 200 of FIG. 2 and have been denoted using the same reference numerals.

Similar to system 200, the 9 TB data in the cartridge (203A or 203B) may be divided into a plurality of data sets (DSs). In some embodiments, a data set includes x megabytes (e.g., 5 MB) of data. In each cartridge (203A or 203B), each of the data sets is numbered from zero to a certain number (e.g., N=1 million). For example, as shown in FIG. 5, in each cartridge (203A or 203B), the data sets are $DS_i$, including $DS_0$, $DS_1$, $DS_2$, . . . and $DS_N$, where i=0, 1, 2, . . . N.

The $i^{th}$ data set ($DS_i$) in the $j^{th}$ cartridge in each of the tape libraries (202A or 202B) all together form an error correction data set group 204 for error correction. Only a data set in one cartridge in each tape library is combined with another data set in one cartridge in the other tape libraries to form the same error correction data set group 204. Error correction data set group 204 spans across multiple cartridges and multiple tape libraries. For example, as shown in FIG. 5, $DS_0$ in Library-1 202A, $DS_0$ in Library-2 202A, $DS_0$ in Library-3 202A, $DS_0$ in Library-4 202A, $DS_0$ in Library-5 202A, $DS_0$ in Library-6 202B, and $DS_0$ in Library-7 202B form a group for error correction, as indicated by the same shade pattern. $DS_1$ in Library-1 202A, $DS_1$ in Library-2 202A, $DS_1$ in Library-3 202A, $DS_1$ in Library-4 202A, $DS_1$ in Library-5 202A, $DS_1$ in Library-6 202B, and $DS_1$ in Library-7 202B form a second group for error correction, as indicated by a different shade pattern.

The $i^{th}$ data set ($DS_i$) in the $j^{th}$ cartridge in Library-6 202B (P1) and the $i^{th}$ data set ($DS_i$) in the $j^{th}$ cartridge in Library-7 202B (P2) are the parity data of the five $i^j$ data sets ($DS_i$) in the $j^{th}$ cartridge in Library-1 202A, Library-2 202A, Library-3 202A, Library-4 202A, and Library-5 202A (D1-D5). For example, as shown in FIG. 5, $DS_0$ in Library-6 202B is the first version of error-correcting information (P1) for the five $DS_0$ data sets in Library-1 to Library-5 (D1-D5). $DS_0$ in Library-7 202B is the second version of error-correcting information (P2) for the five $DS_0$ data sets in Library-1 to Library-5 (D1-D5). Similarly, as shown in FIG. 5, $DS_1$ in Library-6 202B is the first version of error-correcting information (P1) for the five $DS_1$ data sets in Library-1 to Library-5 (D1-D5). $DS_1$ in Library-7 202B is the second version of error-correcting information (P2) for the five $DS_1$ data sets in Library-1 to Library-5 (D1-D5).

The one or more versions of data set group level error-correcting information for each data set group are calculated by one or more head node machines. These parity bytes (P1 or P2) include data set group level error-correcting information that corrects the errors within the data sets in a data set group. In the example shown in FIG. 5, the one or more versions of data set group level error-correcting code include P1 and P2. However, different number of versions (e.g., 3 or 4) of data set group level error-correcting code may be used. In some embodiments, each of P1 and P2 is a function of the data sets in a group, such as a linear weighted function over a Galois field.

However, in system 500, in addition to having the $i^t$ data set ($DS_i$) in the $j^t$ cartridge in each of the tape libraries (202A or 202B) all together forming an error correction data set group 204 for error correction, each cartridge (203A or 203B) has the cartridge's own parity data. As shown in FIG. 5, in each cartridge (203A or 203B), the data sets are $DS_i$, including $DS_0$, $DS_1$, $DS_2$, . . . and $DS_N$, where i=0, 1, 2, . . . N. These N+1 data sets in each cartridge form another error correction data set group 504. For example, as shown in FIG. 5, $DS_0$, $DS_1$, $DS_2$, . . . and $DS_N$ in Library-1 202A form a group for error correction. For example, $DS_0$, $DS_1$, $DS_2$, . . . and $DS_N$ in Library-6 202B form a group for error correction. Error correction data set group 504 spans across only a single cartridge.

In each error correction data set group 504, a number of versions of error-correcting information may be stored in the cartridge. The data sets $DS_{N+1}$, $DS_{N+2}$, $DS_{N+3}$, $DS_{N+4}$ in each cartridge are the parity data of the data sets including $DS_0$, $DS_1$, $DS_2$, . . . and $DS_N$ in the same cartridge. For example, as shown in FIG. 5, $DS_{N+1}$ in Library-1 202A is the first version of error-correcting information for the data sets including $DS_0$, $DS_1$, $DS_2$, . . . and $DS_N$. $DS_{N+2}$ in Library-1 202A is the second version of error-correcting information for the data sets including $DS_0$, $DS_1$, $DS_2$, . . . and $DS_N$. $DS_{N+3}$ in Library-1 202A is the third version of error-correcting information for the data sets including $DS_0$, $DS_1$, $DS_2$, . . . and $DS_N$. $DS_{N+4}$ in Library-1 202A is the fourth version of error-correcting information for the data sets including $DS_0$, $DS_1$, $DS_2$, . . . and $DS_N$.

In some embodiments, N is equal to 163. Each cartridge has its own Reed-Solomon decoding, such as RS(164:168) decoding. For every 164 data sets, there are four parities for those data sets. For example, for the data sets $DS_0$, $DS_1$, $DS_2$, . . . and $DS_{163}$, there are four parity data sets $DS_{164}$, $DS_{165}$, $DS_{166}$, and $DS_{167}$.

The one or more versions of data set group level error-correcting information for each data set group 504 are calculated by one or more head node machines. These parity bytes include data set group level error-correcting information that corrects the errors within the data sets in a data set group. In the example shown in FIG. 5, there are four versions of data set group level error-correcting code. However, different number of versions of data set group level error-correcting code may be used. In some embodiments, each version of data set group level error-correcting code is a function of the data sets in a group, such as a linear weighted function over a Galois field.

Figure 6:
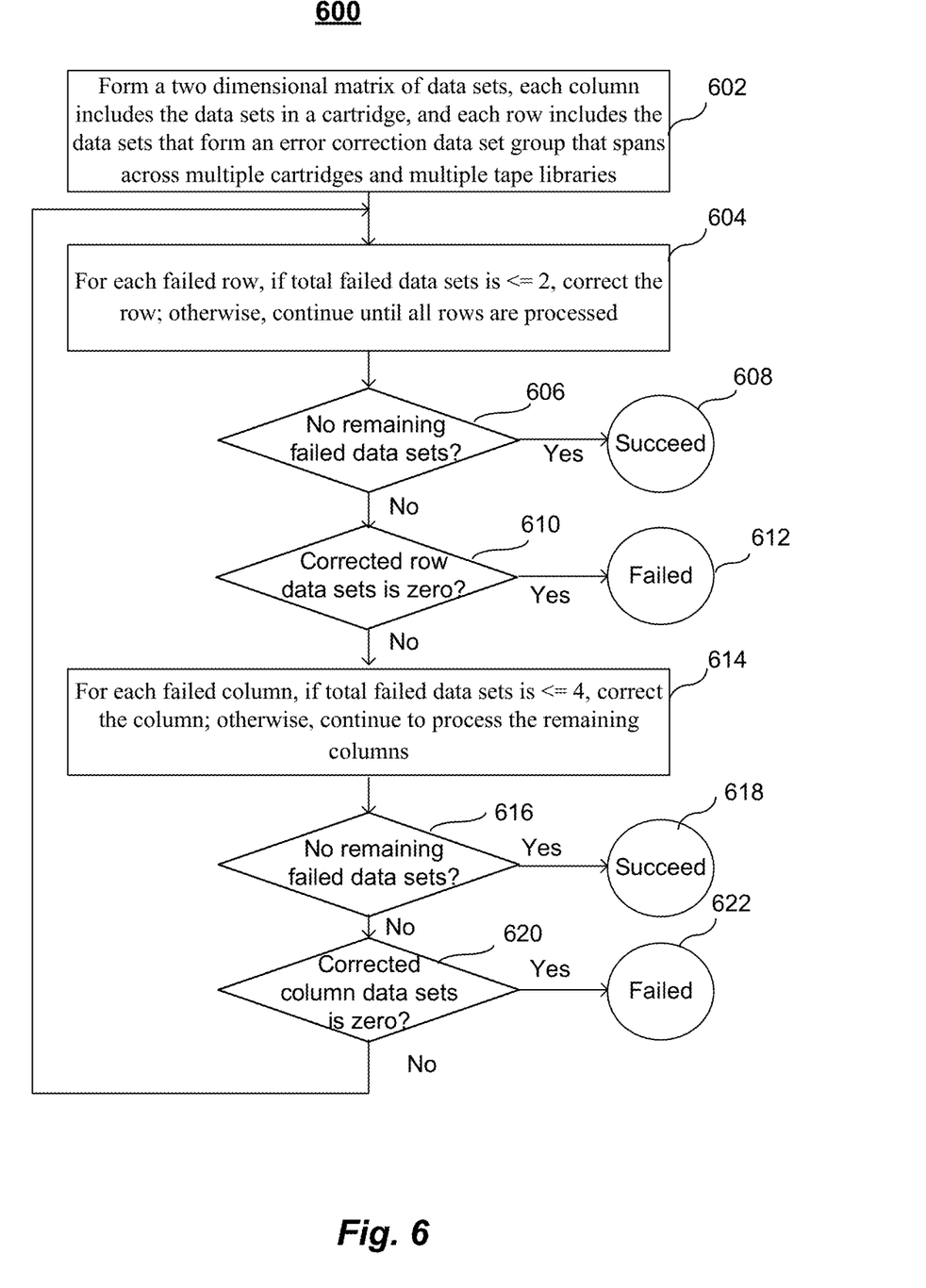
FIG. 6 illustrates an embodiment of a flow diagram of a process 600 that uses an improved error recovery technique across a plurality of tape libraries to rebuild any failed data.

FIG. 6 illustrates an embodiment of a flow diagram of a process 600 that uses an improved error recovery technique across a plurality of tape libraries to rebuild any failed data. In some embodiments, process 600 is performed in the tape storage system 500 shown in FIG. 5. In process 600, when there are more than two cartridge failures, the 9 TB of data from each cartridge plus the additional parity data sets inside each cartridge are read. FIG. 7A-7E illustrate the different stages of an example in which process 600 is performed to recover the failed data read from tape storage system 500.

Figure 7A:
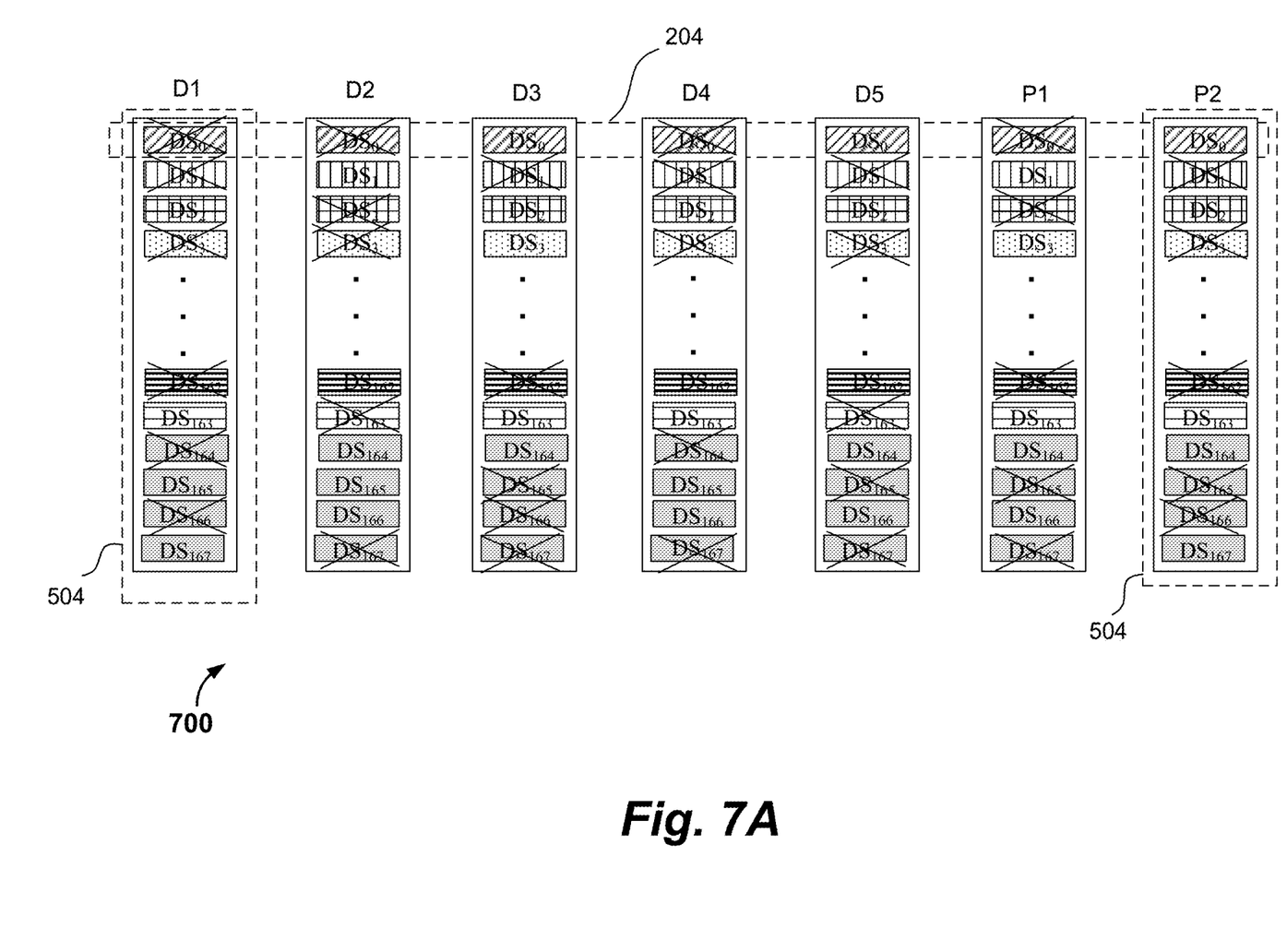
FIG. 7A illustrates the matrix 700 of data sets before any error correction is performed.

With reference to FIG. 6, at step 602 of process 600, a two-dimensional matrix 700 of data sets is formed as shown in FIG. 7A. Each column of the matrix 700 includes the data sets in a cartridge (e.g., D1, D2, . . . P1, or P2). The data sets in a column form an error correction data set group 504 that spans across only a single cartridge. In some embodiments, the error correction code for error correction data set group 504 may be an RS(164:168) code, which can rebuild the failed data sets in the column if there are <=4 data sets with errors in that column. A column having four or more failed data sets cannot be corrected by using RS(164:168) decoding alone because the code can only correct up to four data sets in the cartridge.

Each row of the matrix includes the data sets that form an error correction data set group 204 that spans across multiple cartridges and multiple tape libraries. The error correction code for error correction data set group 204 may be an RS(5:7) code, which can rebuild the failed data sets in the row if there are <=2 data sets with errors in that row. A row of data sets having two or more failed data sets cannot be corrected by using RS(5:7) decoding alone because the code can only correct up to two cartridge failures.

FIG. 7A illustrates the matrix 700 of data sets before any error correction is performed. Each of the data sets in the cartridges that has errors is indicated by an "x." In the D1 cartridge, there are six data sets with errors, including $DS_0$, $DS_1$, $DS_3$, $DS_{162}$, $DS_{164}$, and $DS_{166}$. In each of the D2, D3, D4, D5, P1, and P2 cartridges, there are five failed data sets.

In process 600, the failed data sets are rebuilt by iterating between correcting the rows of data sets that can be corrected using the error correction code for the error correction data set groups 204 (e.g., an RS(5:7) code) and correcting the columns of data sets that can be corrected using the error correction code for error correction data set groups 504 (e.g., RS(164:168) code), until all the failed data sets are corrected.

At step 604, each row in matrix 700 that has a total of no more than two data sets with errors is corrected using the error correction code for the error correction data set groups 204 (e.g., an RS(5:7) code). For each row that has errors, if the number of total failed data sets is <=2, then the row is corrected; otherwise, process 600 continues to the next row in matrix 700 until all the rows are processed.

Figure 7B:
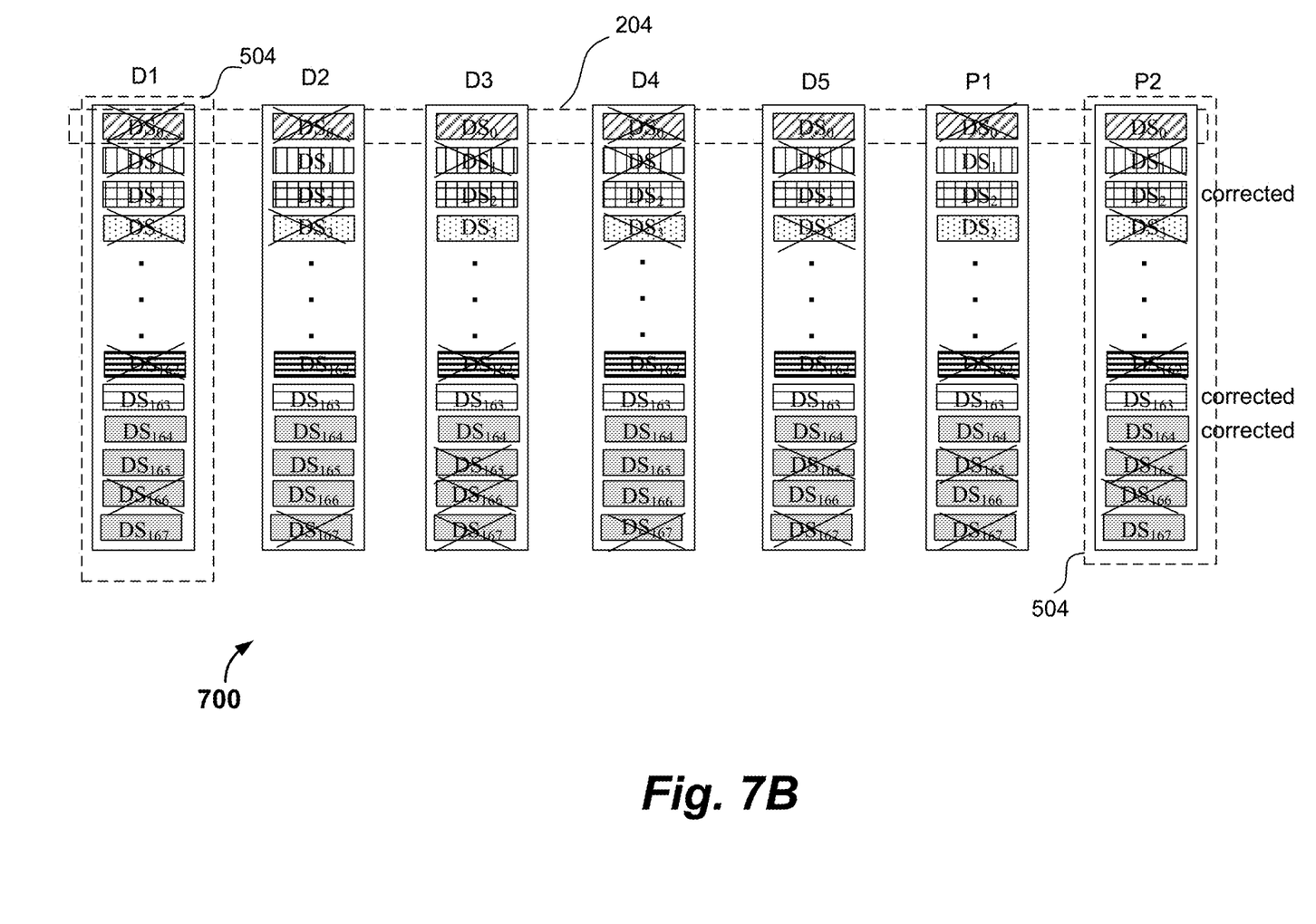
FIG. 7B illustrates the matrix 700 of data sets after step 604 is performed.

FIG. 7B illustrates the matrix 700 of data sets after step 604 is performed. Referring back to FIG. 7A, each of the $DS_2$, $DS_{163}$, and $DS_{164}$ groups has two or fewer data set failures. Therefore, FIG. 7B shows that these three rows of data sets are corrected at step 604. In some embodiments, the corrected data is stored in the buffered location, replacing the failed or missing data sets.

At step 606, it is determined whether there are no longer any failed data sets remaining. If there is none, then process 600 proceeds to step 608 where the process exits with a successful status. If there are still one or more failed data sets remaining in matrix 700, then process 600 proceeds to step 610. FIG. 7B shows that there are additional failed data sets remaining and therefore process 600 proceeds to step 610.

At step 610, it is determined whether the number of rows corrected at step 604 is zero. If the number of corrected rows is zero, then process 600 proceeds to step 612 where the process exits with a failed status. If the number of corrected rows is non-zero, then process 600 proceeds to step 614. FIG. 7B shows that step 604 has corrected a total of three rows and therefore process 600 proceeds to step 614.

At step 614, each column in matrix 700 that has a total of no more than four data sets with errors is corrected using the error correction code for the error correction data set groups 504 (e.g., an RS(164:168) code). For each column that has errors, if the number of total failed data sets is <=4, then the column is corrected; otherwise, process 600 continues to the next column in matrix 700 until all the columns are processed.

Figure 7C:
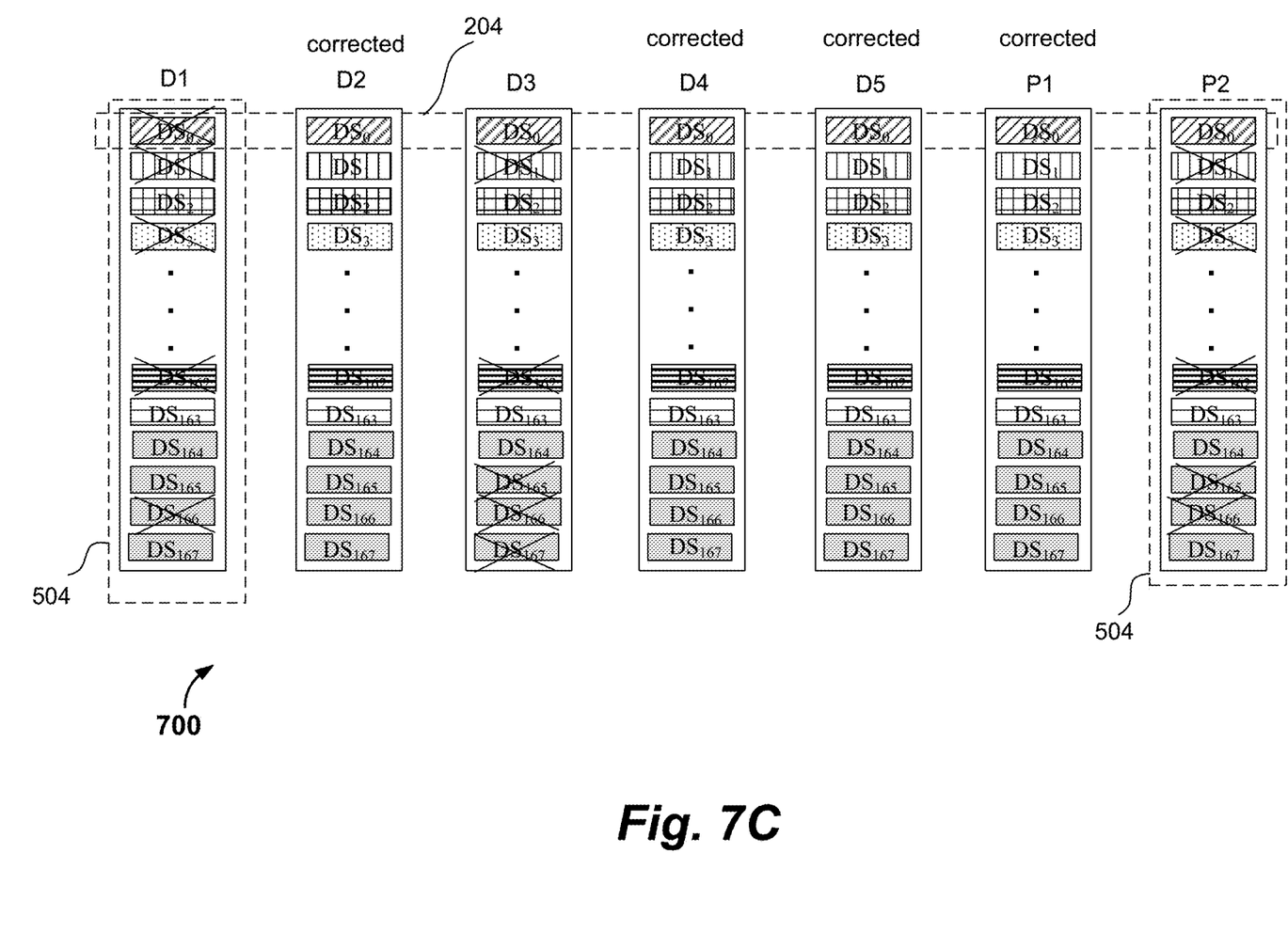
FIG. 7C illustrates the matrix 700 of data sets after step 614 is performed.

FIG. 7C illustrates the matrix 700 of data sets after step 614 is performed. Referring back to FIG. 7B, each of the D2, D4, D5, and P1 cartridges has four or fewer data set failures. Therefore, FIG. 7C shows that these four columns of data sets are corrected at step 614. In some embodiments, the rebuilt data is stored back in the buffered location, replacing the missing or failed data sets.

At step 616, it is determined whether there are no longer any failed data sets remaining. If there is none, then process 600 proceeds to step 618 where the process exits with a successful status. If there are still failed data sets remaining in matrix 700, then process 600 proceeds to step 620. FIG. 7B shows that there are additional failed data sets remaining and therefore process 600 proceeds to step 620.

At step 620, it is determined whether the number of columns corrected at step 614 is zero. If the number of corrected rows is zero, then process 600 proceeds to step 622 where the process exits with a failed status. If the number of corrected columns is non-zero, then process 600 proceeds back to step 604. FIG. 7C shows that step 614 has corrected a total of four columns and therefore process 600 proceeds to step 604.

Figure 7D:
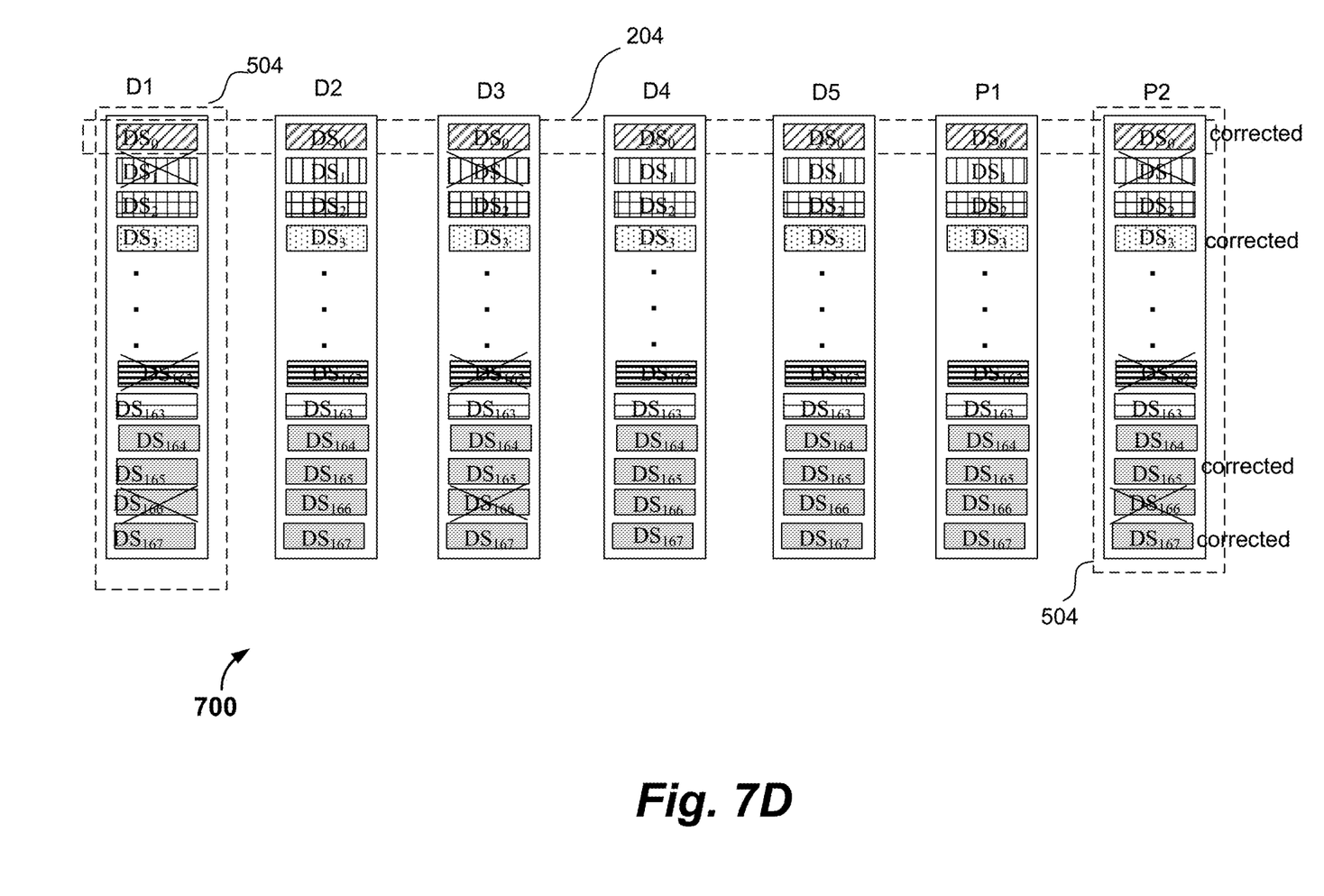
FIG. 7D illustrates the matrix 700 of data sets after step 604 is performed.

FIG. 7D illustrates the matrix 700 of data sets after step 604 is performed. Referring back to FIG. 7C, each of the $DS_0$, $DS_3$, $DS_{165}$, and $DS_{167}$ groups has two or fewer data set failures. Therefore, FIG. 7D shows that these four rows of data sets are corrected at step 604. In some embodiments, the corrected data is stored in the buffered location, replacing the failed or missing data sets.

At step 606, FIG. 7D shows that there are additional failed data sets remaining and therefore process 600 proceeds to step 610.

At step 610, FIG. 7D shows that step 604 has corrected a total of four rows and therefore process 600 proceeds to step 614.

Figure 7E:
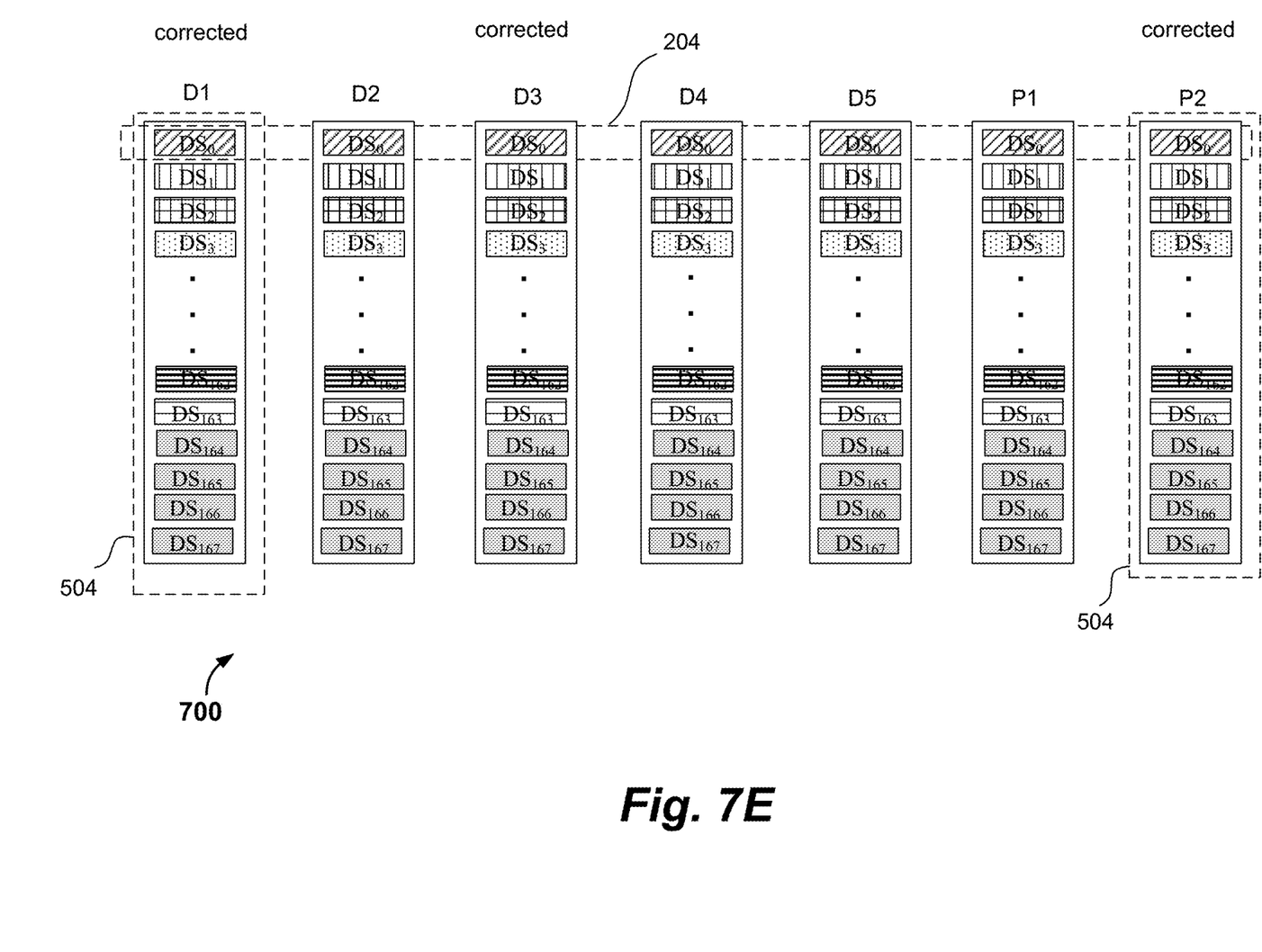
FIG. 7E illustrates the matrix 700 of data sets after step 614 is performed.

FIG. 7E illustrates the matrix 700 of data sets after step 614 is performed. Referring back to FIG. 7D, each of the D1, D3, and P2 cartridges has four or fewer data set failures. Therefore, FIG. 7E shows that these three columns of data sets are corrected at step 614. In some embodiments, the rebuilt data is stored back in the buffered location, replacing the missing or failed data sets.

FIG. 7E shows that there are no additional failed data sets remaining and therefore process 600 proceeds to step 618, where the process exits with a successful status. All errors in matrix 700 have been recovered.

In some embodiments, the $DS_i$ groups may not be physically aligned across different cartridges. For example, the $DS_0$ data sets in the D1-D5 and P1-P2 cartridges are not aligned. The remote worker machine may create a logical mapping table over the seven tape libraries. The logical mapping table is used to map a data set to a physical location in its cartridge. The remote worker machine may use the logical mapping table to read the data sets from the cartridge and store the data sets into matrix 700 before the matrix may be processed using process 600 as discussed above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   forming a matrix of data sets that comprise data sets in a plurality of tape storage media, wherein a row of the matrix corresponds to a horizontal error correction data set group, and the row comprises data sets that span across the plurality of tape storage media, and wherein a column of the matrix corresponds to a vertical error correction data set group, and the column comprises data sets that span across a single tape storage media;
   receiving one or more indications, wherein an indication indicates that an indicated data set stored on an indicated tape storage media is associated with a failure;
   identifying horizontal error correction data set groups for the indicated data sets;
   selectively obtaining data sets corresponding to the identified horizontal error correction data set groups, wherein selectively obtaining the data sets corresponding to an identified horizontal error correction data set group comprises selectively obtaining one or more data sets other than the indicated data set that are included in the identified horizontal error correction data set group from one or more corresponding tape storage media other than the tap storage media storing the indicated data set without reading entire contents of the one or more corresponding tape storage media; and
   correcting errors using the identified horizontal error correction data set groups and their corresponding rows of the matrix before correcting errors using vertical error correction data set groups and their corresponding columns of the matrix.

2. The method of claim 1, wherein selectively obtaining one or more data sets other than the indicated data set that are included in the identified horizontal error correction data set group comprises obtaining one or more data sets including parity data of the identified horizontal error correction data set group, and wherein the parity data of the identified horizontal error correction data set group includes error-correcting information that corrects at least some of the errors within the indicated data set or the one or more data sets other than the indicated data set that are included in the identified horizontal error correction data set group.

3. The method of claim 2, wherein the indicated data set and a plurality of other additional data sets are stored in the same tape storage media.

4. The method of claim 3, further comprising continuing to read the other additional data sets that are stored in the same tape storage media in response to receiving the indication that the indicated data set stored on the tape storage media is associated with a failure.

5. The method of claim 3, wherein at least one of the plurality of other additional data sets that are stored in the same tape storage media comprises parity data of a second error correction data set group, wherein the second error correction data set group is different from the identified horizontal error correction data set group, and wherein the second error correction data set group spans across a single tape store media, and wherein the parity data of the second error correction data set group includes error-correcting information that corrects at least some of the errors within the indicated data set or the plurality of other additional data sets that are stored in the same tape storage media.

6. The method of claim 5, further comprising:
   determining that not all of the errors within the indicated data set and the one or more data sets other than the indicated data set that are included in the identified horizontal error correction data set group can be corrected by the parity data of the identified horizontal error correction data set group.

7. The method of claim 1, further comprising:
utilizing the matrix of data sets to recover at least some of the errors within the indicated data set and the one or more data sets other than the indicated data set that are included in the identified horizontal error correction data set group.

8. The method of claim 1, wherein the indicated tape storage media corresponds to a first tape library, and wherein the different tape storage media corresponds to another tape library different from the first tape library, and wherein the first tape library includes the indicated tape storage media and a plurality of other additional tape storage media.

9. A system, comprising:
a processor; and
a memory coupled with the processor, wherein the memory is configured to provide the processor with instructions which when executed cause the processor to:
form a matrix of data sets that comprise data sets in a plurality of tape storage media, wherein a row of the matrix corresponds to a horizontal error correction data set group, and the row comprises data sets that span across the plurality of tape storage media, and wherein a column of the matrix corresponds to a vertical error correction data set group, and the column comprises data sets that span across a single tape storage media;
receive one or more indications, wherein an indication indicates that an indicated data set stored on an indicated tape storage media is associated with a failure;
identify horizontal error correction data set groups for the indicated data sets;
selectively obtain data sets corresponding to the identified horizontal error correction data set groups, wherein selectively obtain the data sets corresponding to an identified horizontal error correction data set group comprises selectively obtain one or more data sets other than the indicated data set that are included in the identified horizontal error correction data set group from one or more corresponding tape storage media other than the tap storage media storing the indicated data set without reading entire contents of the one or more corresponding tape storage media; and
correcting errors using the identified horizontal error correction data set groups and their corresponding rows of the matrix before correcting errors using vertical error correction data set groups and their corresponding columns of the matrix.

10. The system of claim 9, wherein selectively obtaining one or more data sets other than the indicated data set that are included in the identified horizontal error correction data set group comprises obtaining one or more data sets including parity data of the identified horizontal error correction data set group, and wherein the parity data of the identified horizontal error correction data set group includes error-correcting information that corrects at least some of the errors within the indicated data set or the one or more data sets other than the indicated data set that are included in the identified horizontal error correction data set group.

11. The system of claim 10, wherein the indicated data set and a plurality of other additional data sets are stored in the same tape storage media.

12. The system of claim 11, wherein the memory is further configured to provide the processor with instructions which when executed cause the processor to: continue to read the other additional data sets that are stored in the same tape storage media in response to receiving the indication that the indicated data set stored on the tape storage media is associated with a failure.

13. The system of claim 11, wherein at least one of the plurality of other additional data sets that are stored in the same tape storage media comprises parity data of a second error correction data set group, wherein the second error correction data set group is different from the identified horizontal error correction data set group, and wherein the second error correction data set group spans across a single tape store media, and wherein the parity data of the second error correction data set group includes error-correcting information that corrects at least some of the errors within the indicated data set or the plurality of other additional data sets that are stored in the same tape storage media.

14. The system of claim 13, wherein the memory is further configured to provide the processor with instructions which when executed cause the processor to:
determine that not all of the errors within the indicated data set and the one or more data sets other than the indicated data set that are included in the identified horizontal error correction data set group can be corrected by the parity data of the identified horizontal error correction data set group.

15. The system of claim 9, wherein the memory is further configured to provide the processor with instructions which when executed cause the processor to:
utilize the matrix of data sets to recover at least some of the errors within the indicated data set and the one or more data sets other than the indicated data set that are included in the identified horizontal error correction data set group.

16. A computer program product, the computer program product being embodied in a non-transitory computer readable storage medium and comprising computer instructions for:
forming a matrix of data sets that comprise data sets in a plurality of tape storage media, wherein a row of the matrix corresponds to a horizontal error correction data set group, and the row comprises data sets that span across the plurality of tape storage media, and wherein a column of the matrix corresponds to a vertical error correction data set group, and the column comprises data sets that span across a single tape storage media;
receiving one or more indications, wherein an indication indicates that an indicated data set stored on an indicated tape storage media is associated with a failure;
identifying horizontal error correction data set groups for the indicated data sets;
selectively obtaining data sets corresponding to the identified horizontal error correction data set groups, wherein selectively obtaining the data sets corresponding to an identified horizontal error correction data set group comprises selectively obtaining one or more data sets other than the indicated data set that are included in the identified horizontal error correction data set group from one or more corresponding tape storage media other than the tap storage media storing the indicated data set without reading entire contents of the one or more corresponding tape storage media; and
correcting errors using the identified horizontal error correction data set groups and their corresponding rows of the matrix before correcting errors using vertical error correction data set groups and their corresponding columns of the matrix.

* * * * *